Oct. 12, 1954    G. A. LYON    2,691,545
FENDER AND FENDER SHIELD ASSEMBLY
Filed June 21, 1949
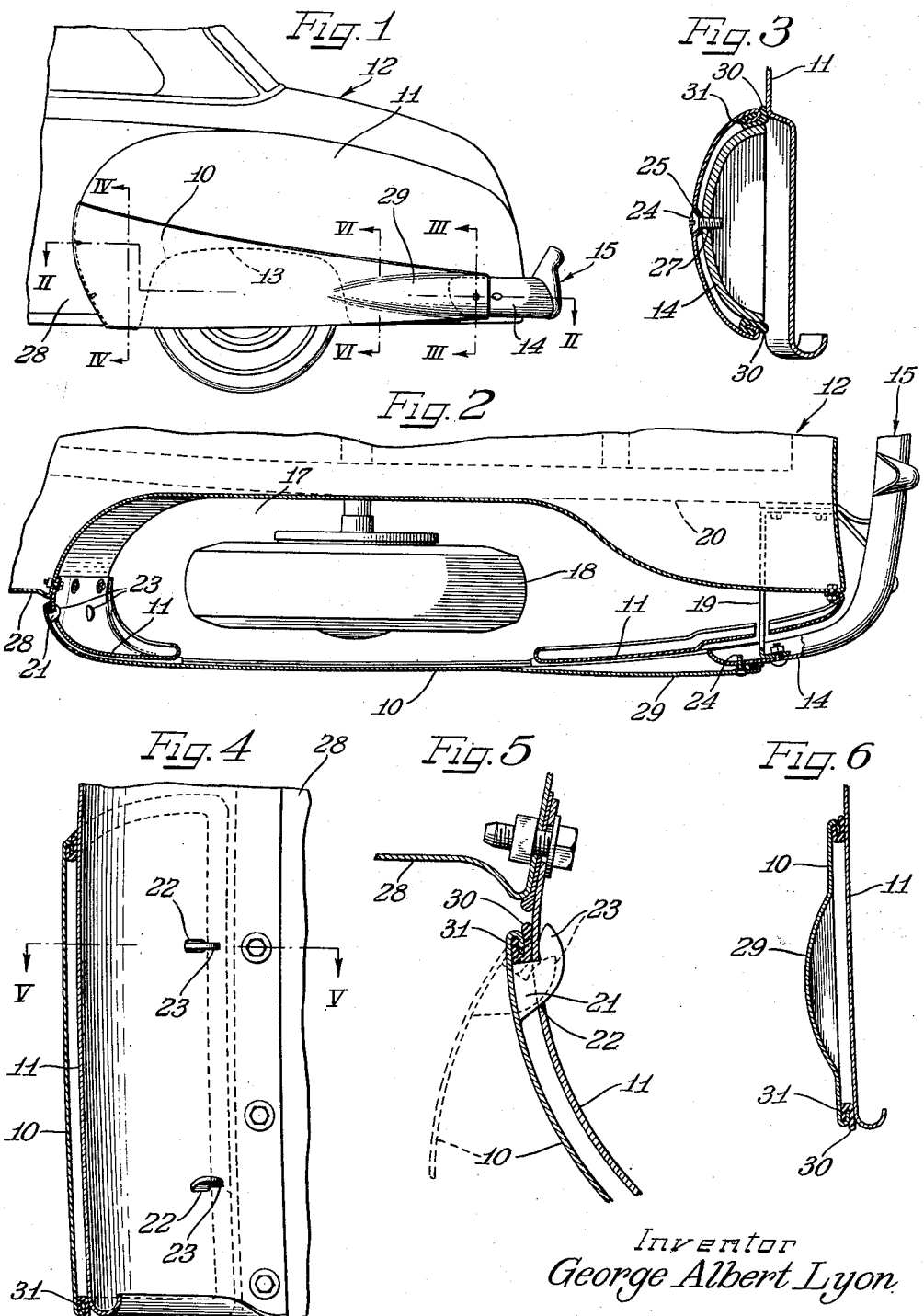
Inventor
George Albert Lyon
by The Firm of Charles W. Hills    Attys Patented Oct. 12, 1954

2,691,545

UNITED STATES PATENT OFFICE 2,691,545

FENDER AND FENDER SHIELD ASSEMBLY

George Albert Lyon, Detroit, Mich., assignor to Lyon, Incorporated, Detroit, Mich., a corporation of Michigan Application June 21, 1949, Serial No. 100,367

7 Claims. (Cl. 293—62)

The present invention relates to improvements in vehicle construction and more particularly relates to a novel fender and fender shield assembly.

An important object of the present invention is to provide in a vehicle having a fender with a wheel access opening a novel closure structure which has the multiple functions of a wheel access opening closure, protection for the fender and implementation of the streamlining of the vehicle.

Another object of the invention is to provide an improved fender and fender shield construction wherein the fender shield is supported by the fender and also by means independent of the fender such as the bumper of the associated vehicle.

A further object of the invention is to provide an improved fender shield which is adapted to be pivotally secured to the fender and is detachably attachable to the bumper of the associated vehicle.

According to the general features of the present invention there is provided in a vehicle including a fender having a wheel access opening and a bumper having a portion thereof in general overlapping relation to one end portion of the fender, a fender shield hingedly mounted on the fender and having detachable connection with the overlapping portion of the bumper.

According to other general features of the invention, the means by which the fender shield is attached to the fender comprises a pivot hook structure detachably engageable within an appropriate aperture in the fender and the means for securing the fender shield detachably to the bumper comprises a screw.

According to other general features of the invention there is provided a fender shield for disposition at the outer side of a vehicle fender for closing the wheel access opening therein and protectively covering a portion of the fender and a portion of the side sweep arm of a vehicle bumper, a fender shield body, means at one end of the fender shield body for pivotally connecting the fender shield body to the fender, and means at the opposite end of the fender shield for detachably connecting the fender shield to the bumper.

Other objects, features and advantages of the present invention will be readily apparent from the following detailed description of a preferred embodiment thereof taken in conjunction with the accompanying drawings, in which:

Figure 1 is a fragmentary side elevational view of an automobile embodying the fender and fender shield assembly according to the present invention;

Figure 2 is an enlarged horizontal sectional detail view taken substantially on the line II—II of Figure 1;

Figure 3 is an enlarged vertical sectional detail view taken substantially on the line III—III of Figure 1;

Figure 4 is an enlarged fragmentary vertical sectional detail view taken substantially on the line IV—IV of Figure 1;

Figure 5 is a horizontal sectional detail view substantially on the line V—V of Figure 4, and Figure 6 is a vertical sectional detail view on an enlarged scale taken substantially on the line VI—VI of Figure 1.

As shown on the drawings:

According to the present invention a fender shield 10 is disposed with relation to a fender 11 of a vehicle 12 to enclose a wheel access opening 13 in the fender. At its forward end portion the fender shield 10 is attached to the fender 11 while at its rear end portion the fender shield is attached to a side-swept arm 14 of a bumper 15 which in the present instance is the rear bumper of the vehicle. The fender 11 encloses a wheel well 17 within which a wheel 18 and in the present instance, a rear wheel, is housed. The bumper 15 and more particularly the arm 14 thereof, which overlaps the rear portion of the fender 11, is supported independently of the fender by means such as a bracket 19 carried by the chassis and more especially the chassis frame of the vehicle, the latter being shown in dash outline at 20.

The fender shield 10 is mounted in such a manner that it can be readily assembled or detached from the wheel access opening enclosing relation with the fender 11 and for this purpose is preferably mounted pivotally at its forward end upon the fender. To this end a pair of pivotal attachment hook members 21 are carried by the inner face of the forward end portion of the fender shield 10 and adapted to engage within appropriate slots 22 in the forward fender wall. As best seen in Figures 4 and 5, each of the pivotal attachment hooks includes at the inner portion thereof an attachment finger 23 which is engageable through the respective aperture 22 and with the inside of the fender adjacent the aperture whereby to retain the fender shield against displacement except deliberate swinging of the fender shield about a generally vertical axis between open and closed positions, substantially as indicated in dash and full outline in Figure 5. Thus, to assemble the fender shield it is initially lifted to the position wherein the pivot fingers 21 can be inserted into the respective apertures 22 in the fender 11 and the fender shield is then swung forwardly while the finger portions 23 engage within the fender and draw the forward end portion of the fender shield into snug engagement with the fender.

At its rear end, the fender shield is detachably secured to the arm 14 of the bumper and is thus supported at its rear end independently of the fender while nevertheless maintaining a snug closing engagement with the fender. For this purpose, a screw 24 is received through a countersunk or inset flange defined aperture 25 in the rear portion of the fender shield and is threaded into a tapped aperture 27 in the bumper arm 14. Hence, after the fender shield 10 has been swung into closing relation to the fender, the rear end portion of the fender shield is securely, but detachably attached to the bumper arm 14 and is supported by the bumper arm.

To enhance the function of the fender shield 10 as a protective medium for the forward portion of the fender 11, the forward portion of the fender shield is preferably wider than might ordinarily be necessitated for simply covering the wheel access opening 13 and the forward edge of the fender shield is disposed in relatively close proximity to the adjacent portion of the vehicle body as identified at 28. Thereby the forward portion of the fender shield serves in the nature of a scuff guard for the fender. If preferred, the forward portion of the fender shield may be equipped with a conventional scuff pad.

From the forward fender protecting portion of the fender shield, the upper margin of the fender shield tapers downwardly and rearwardly and the rear end portion of the fender shield is preferably so constructed as to substantially embrace the bumper arm 14 so as to afford vertical stability for the fender shield. To this end the rear end portion of the fender shield is preferably shaped substantially arcuately in cross-section to define a bumper receiving rib 29 which for streamlining purposes preferably merges into the general plane of the body of the fender shield forwardly of the bumper arm. Through this arrangement, the rear end portion of the fender shield is not only strengthened, but is adapted for substantial engagement of its upper and lower margins with the upper and lower margins of the bumper arm 14 to afford vertical stability for the rear end portion of the fender shield. In addition, the streamlined rib 29 affords streamlining for the juncture of the fender shield with the bumper arm 14 and prevents wind resistance at the forward end of the arm 14.

In order to afford a snug, rattle-free and fairly dirt-tight engagement between the fender shield 10 and the fender 11 and the bumper arm 14, the margin of the fender shield is equipped with a resilient sealing gasket 30 which may be formed from rubber or synthetic rubber and which is of generally U-shaped cross-section and interconnected with a return bent marginal reinforcing flange 31 on the fender shield. As best seen in Figures 4, 5 and 6, the gasket 30 is in the fully assembled relation of the fender shield clamped between the margin of the fender shield and the adjacent wall of the fender 11. As best seen in Figure 3, the gasket 30 is clamped between the upper and lower margins of the rear portion of the fender shield and the bumper arm 14.

Although the fender 11 has been shown as of the type which is detachably secured to the vehicle body 28, it is, of course, clear that the fender may comprise an integral one piece part of the vehicle body and may even be flush with the vehicle body at the forward end of the fender. In such event, of course, the forward portion of the fender shield will be flat in conformity with the fender wall instead of being arcuate to conform to the forward wall of the fender as specifically shown herein.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fender shield for disposition at the outer side of a vehicle fender for closing the wheel access opening therein and protectively covering a portion of the fender and a portion of the side sweep arm of a vehicle bumper, a fender shield body, means at one end of the fender shield body for pivotally connecting the fender shield body directly to the fender, and means at the opposite end of the fender shield for detachably connecting the fender shield to the bumper, said last mentioned means including portions engageable with the upper and lower margins of the bumper and also a relatively movable detachably secured member.

2. In a fender and fender shield assembly including a fender having a wheel access opening and a bumper having a portion generally overlapping one end portion of the fender, a fender shield having one end portion engaging the fender and the opposite end portion engaging the bumper, a pair of pivot hook members carried by the fender engaging portion of the fender shield and pivotally engaging the fender, and a securing member securing the bumper engaging end of the fender shield to the bumper, said bumper-engaging end of the fender shield also having means thereon marginally engageable with the bumper for vertical stability.

3. In a fender and fender shield assembly including a fender having a wheel access opening and a bumper having a portion generally overlapping one end portion of the fender, a fender shield having one end portion engaging the fender and the opposite end portion engaging the bumper, a pair of pivot hook members carried by the fender engaging end portion of the fender shield and pivotally engaging the fender, a securing member securing the bumper engaging end portion of the fender shield to the bumper, said bumper-engaging end of the fender shield also having means thereon marginally engageable with the bumper for vertical stability, said securing member comprising a screw extending through an aperture in the fender shield and tapped into an aperture in the bumper.

4. A fender shield for disposition at the outer side of a vehicle fender with which a bumper is disposed in an inwardly overlapping relation to one end portion, the fender shield comprising an elongated panel, one end of the fender shield panel being of enlarged width and having respective spaced pivotal attachment hooks for pivotal interengagement with the fender and the opposite end of the fender shield panel being of inwardly opening channel shape and reduced width substantially merging with the bumper, and having means for engaging the bumper.

5. A fender shield for disposition at the outer side of a vehicle fender with which a bumper is disposed in an inwardly overlapping relation to one end portion, one end of the fender shield being of enlarged width and having respective spaced pivotal attachment hooks for pivotal interengagement with the fender and the opposite end of the fender shield being of reduced width, and having means for engaging the bumper, said reduced end of the fender shield being of generally channel-shape in cross-section and engageable marginally with the opposite margins of the bumper.

6. A fender shield for disposition at the outer side of a vehicle fender with which a bumper is disposed in an inwardly overlapping relation to one end portion of the fender, one end portion of the fender shield being of substantially enlarged width relative to the opposite end portion and having means for attachment to the fender at one side of a wheel access opening in the fender with the central portion of the fender shield extending across the wheel access opening and said opposite end of the fender shield extending into overlapping relation to the bumper, said opposite end portion of the fender shield being of substantially reduced width and of generally channel-shape in cross-section and engageable marginally with the opposite margins of the bumper to support the fender shield on the bumper against vertical movement relative to the bumper.

7. In a fender and fender shield assembly including a fender having a wheel access opening in the lower portion thereof and a bumper disposed in overlapping relation to one end portion of the fender, a fender shield panel having one end portion thereof of substantially enlarged width relative to the opposite end portion and extending in closing relation across said wheel access opening with said enlarged end portion having means for attachment to the fender at the side of the wheel access opening remote from said bumper, said opposite end portion of the fender shield extending into overlapping relation to the bumper, and said opposite end portion of the fender shield being of substantially reduced width and of generally channel-shape in cross-section and engageable marginally with the opposite margins of the bumper to support the fender shield on the bumper against any substantial vertical movement relative to the bumper.

References Cited in the file of this patent

UNITED STATES PATENTS

| Number | Name | Date |
| --- | --- | --- |
| Re. 20,857 | Haltenberger | Sept. 13, 1938 |
| 1,998,134 | Gorman et al. | Apr. 16, 1935 |
| 2,186,505 | Tibbetts | Jan. 9, 1940 |
| 2,187,952 | Rusche | Jan. 23, 1940 |
| 2,217,838 | Fergueson | Oct. 15, 1940 |
| 2,227,425 | Cobb | Jan. 7, 1941 |
| 2,309,724 | Wohlfield | Feb. 2, 1943 |
| 2,352,421 | Wohlfield | June 27, 1944 |
| 2,368,231 | Lyon | Jan. 30, 1945 |